Aug. 2, 1966 F. A. CLARK 3,264,575

BRIDGE CIRCUIT INCLUDING A LOW PASS
TRANSCONDUCTANCE CONTROL CIRCUIT

Filed Jan. 31, 1964 2 Sheets-Sheet 1

INVENTOR
FRANCIS A. CLARK

BY E. F. Dalton

ATTORNEY

Aug. 2, 1966 F. A. CLARK 3,264,575

BRIDGE CIRCUIT INCLUDING A LOW PASS TRANSCONDUCTANCE CONTROL CIRCUIT

Filed Jan. 31, 1964 2 Sheets-Sheet 2

INVENTOR
FRANCIS A. CLARK

BY E. F. Salter

ATTORNEY

United States Patent Office 3,264,575

Patented August 2, 1966

3,264,575

BRIDGE CIRCUIT INCLUDING A LOW PASS TRANSCONDUCTANCE CONTROL CIRCUIT

Francis A. Clark, Waco, Tex., assignor to Southern Fuels Corporation, a corporation of Texas.

Filed Jan. 31, 1964, Ser. No. 341,568

7 Claims. (Cl. 330—146)

Figure 1:
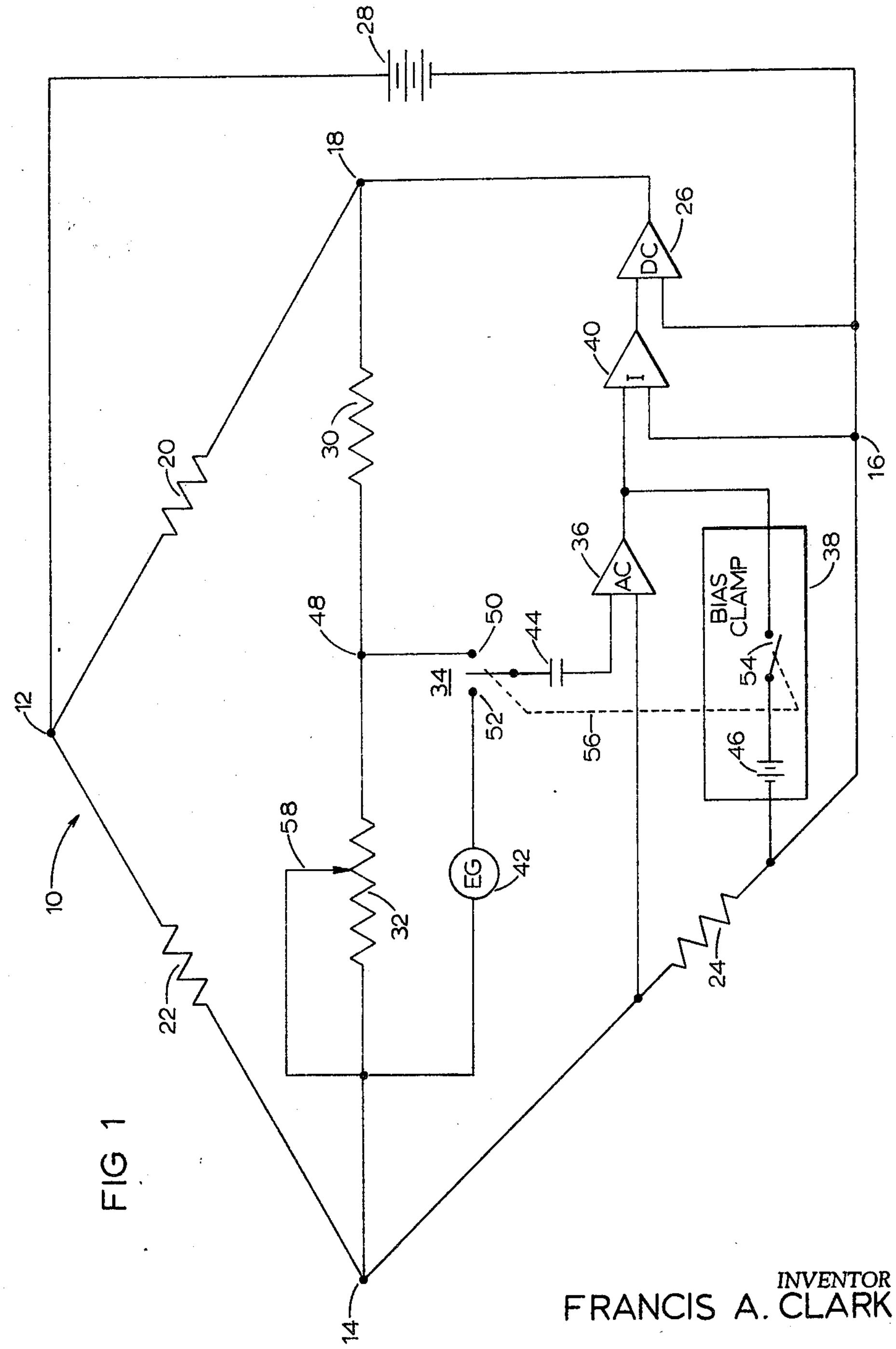

This invention relates generally to a direct current amplifier and more particularly pertains to a bridge circuit having an output controlled by one resistance leg of the bridge which is variable with respect to a voltage difference between an input and the output voltages.

A principal problem in the amplification of direct current voltage is the instability provided by the prior circuits for achieving this purpose. This problem is a result of the direct coupling which must be employed between the successive stages rather than the capacitive coupling which can normally be utilized in alternating current amplifiers.

A second problem encountered in direct current amplifiers, particularly in the small input signal type, is a result of the variations in gain resulting during the operation of the circuit. These variances are dependent upon many factors including temperature, supply voltage amplitude, aging of components, changing circuit parameters, and other transistory conditions. Of course, the problem becomes more acute with lower signal inputs.

In an effort to overcome the above problems, various circuit designs have been proposed. The problem of instability is partially overcome by those circuits which convert the direct current input voltage to an alternating current voltage which is then amplified in an alternating current amplifier. The output of the alternating current amplifier is proportional to the input and when filtered and rectified provides an output proportional in value and substantially similar in other characteristics of the input. Such an expedient, however, cannot always produce a true replica of the input signal and follow the variations thereof with accurate measure. This result is primarily due to the filtering circuit required for the output of the alternating current amplifier. Rectification and filtering of a converted and amplified signal cannot achieve the same characteristics which are inherent in the input signal.

Variations in gain of prior amplifying circuits have resulted in designs which include feedback compensating circuits responsive to the variations. These configurations have resulted in complex circuitry for compensating the errors of the primary circuit. It is well known, as a general rule in designing circuits, that compensating circuits indicate poor design and configurations of the primary circuit.

Another type of circuit designed for eliminating the above problems includes the chopper or comparator for sensing variations between the input and output. The difference of the sensed variations are fed to an alternating current amplifier and are then rectified and filtered to provide a direct current output. This circuit, therefore, is inadequate for providing a true replica of the input at the output, since rectification and filtering are required of the ultimate amplifier output. Such rectification and filtering action cannot provide an exact image of the input signal.

It is therefore, a primary object of this invention to provide a direct current amplifier which does not require filterng and rectifying of an output signal to provide an amplified similitude of an input signal.

It is another primary object of this invention to provide a direct current amplifier which substantially eliminates variation and deviation in the gain of the primary circuit.

Another object of this invention is to provide a direct current amplifier having an output which is a replica of the input and contains all the characteristics thereof.

Still another object of the present invention is to provide a direct current amplifier having an output which is proportional to the input signal throughout the range thereof.

These and other objects will be more fully realized from the novel structure of the instant invention which includes a bridge circuit having respective terminals and resistance legs connected therebetween. One of the resistance legs is variable in response to a voltage difference between the input signal voltage and the output voltage. A source is connected between two opposed terminals and a load is connected between the other two terminals. The output of the load is proportional to the value of the variable resistance leg.

Figure 2:
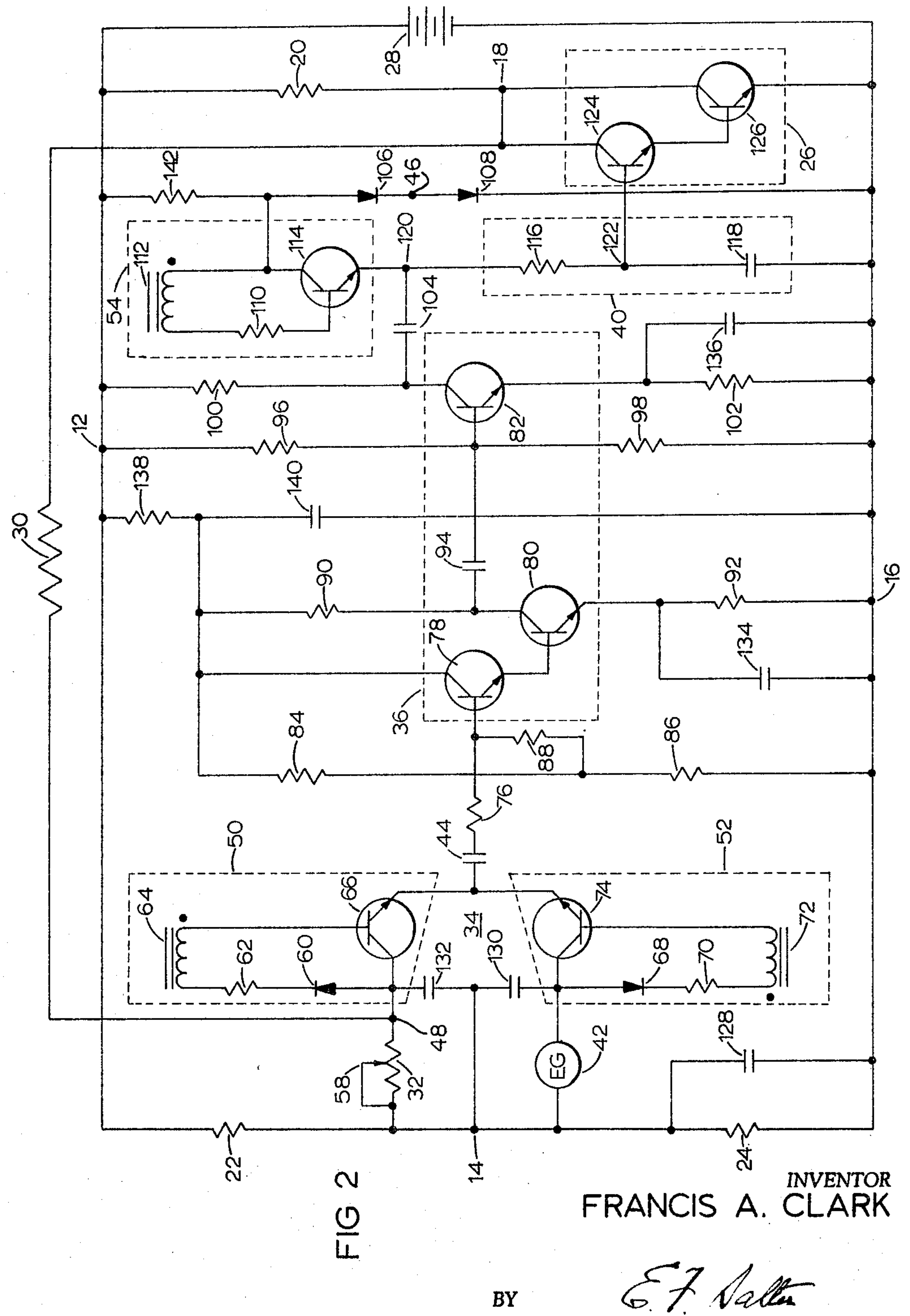

The invention, however, will be more fully realized and understood from the following detailed description when taken in conjunction with the accompanying drawings wherein:

FIGURE 1 is a block diagram of the present invention shown in simplified form to facilitate explanation thereof; and FIGURE 2 is a schematic diagram of the present invention illustrating the components employed in the block diagram of FIGURE 1.

With reference to FIGURE 1, there is shown a bridge circuit generally designated by the reference numeral 10 having respective terminals 12, 14, 16 and 18 and resistance legs 20, 22, and 24 therebetween. The remaining leg of the bridge is formed by the output resistance of a direct current amplifier stage 26. A power source including a battery 28 is connected between terminals 12 and 16. A load resistance 30 is connected in series with variable feedback resistance 32 between terminals 14 and 18.

It can be appreciated that a variation in the impedance of one of the resistance legs of the bridge will cause a change in potential between points 14 and 18 and consequently a change in the output voltage. Since an amplifier is by definition a means of controlling a large voltage with a small voltage, the bridge circuit of the present invention will perform to amplify a small signal by its control of the output resistance of amplifier 26. Control of the output resistance of amplifier 26 is maintained by a comparator circuit 34, an alternating current amplifier 36, a clamping circuit 38, and integrator circuit 40.

Comparator circuit 34 senses a voltage difference between an input signal source 42 and a voltage drop across resistance 32. The voltage difference which is sensed is the voltage developed across said feedback resistance 32 and said signal source 42. The voltage developed across resistance 32 is a proportional measure of the output voltage. The comparator circuit switches between the two voltages of resistance 32 and source 42 and applies the combined waveform to a capacitor 44. By the nature of a capacitor the only sigal transmitted therethrough would be that having a varying amplitude. Therefore, if the voltage drop across resistance 32 and the voltage of source 42 have equal constant amplitudes, no signal will be transmitted through capacitor 44. If, however, a voltage difference results between the input and the output, that difference will be coupled through the capacitor. Comparator 34 is connected through capacitor 44 to an input of amplifier 36 and as a result only the voltage difference between input source 42 and resistance 32 will be sensed by amplifier 36.

Clamping circuit 38 references the output of amplifier 36 to a bias voltage 46. The synchronously clamped signal is integrated by circuit 40 and an output therefrom controls the conduction or output resistance of amplifier 26. Since the output resistance of amplifier 26 controls the potential between terminals 14 and 18, it also controls the voltage developed across resistance 32. Since resistors 30 and 32 perform as a voltage divider the comparator circuit senses the output voltage by virtue of its connection to a point 48. Therefore, when the signal source changes its amplitude, the output across resistance 30 follows to provide balance to the circuit.

Comparator circuit 34 is schematically illustrated in FIGURE 1 by a pair of switches 50 and 52 which operate such that one is normally open when the other is normally closed. Bias clamping circuit 38 also includes a switching means indicated by the numeral 54, and as indicated by the dotted line 56, switches 50, 52, and 54 operate simultaneously. That is, the bias source 46 is switched into and out of the circuit at the same frequency as that of the switches 50 and 52 on the input to the alternating current amplifier. In this fashion the output of the alternating current amplifier is referenced to the bias voltage 46. Thus the bias voltage is clamped into the circuit when the output of the alternating current amplifier is positive or when it is negative. The relative phasing of this bias clamp depends on the phasing of amplifier 36 and amplifier 26 relative to the voltage drop across resistor 32.

The phase shift of the alternating current amplifier is zero while the phase shift of the direct current amplifier stage is 180 degrees. That is, positive voltage at the integrator input causes the output resistance of amplifier 26 to lower; and the voltage drop across resistance 32 to increase until it nearly equals the voltage amplitude of input source 42. Since there is no phase shift in the alternating current amplifier, its positive swing must cause the output resistance of the direct current amplifier to increase. In order for this result to occur, the integrator must provide a negative output. By switching the bias clamp in when the alternating current amplifier is at its positive swing, the net effect of the alternating current swing is a reduction of bias level into the integrator. Therefore, then, the desired arrangement is that switch 54 closes when switch 52 closes.

By making the loop gain of the circuit very high, there need be only a few microvolts steady state difference between the amplitude of the input source and the voltage drop across resistance 32. The current through resistance 32 is then proportional to the input source throughout the linear range of operation. The effective transconductance of the amplifier can be varied by making resistance 32 a variable resistor. A sliding arm 58 is connected between terminal 14 and resistance 32 for providing the necessary adjustment. A near unity ratio between resistors 22 and 24 is necessary in order to allow the current through resistor 32 equal positive and negative dynamic ranges. The ratio of resistance 20 to resistance 22 must be unity for the same reason. The magnitude of the dynamic range is determined by the values of resistances 20, 22, 24, and 30.

A convenient method of load current limiting is thereby provided. Resistances, 20, 22, and 24 are gaged to provide maximum current into a minimum value of resistance 30. Then as the resistance of the load is increased, the amplifier saturates at lower values of load current. The present design will limit when the load current is equal to 12.6 volts divided by the load resistance.

A practical circuit design of the block diagram shown in FIGURE 1 is illustrated in FIGURE 2. A diode 60, resistor 62, winding 64, and transistor 66 form the input switch 50. Switch 52 is formed by a diode 68, resistor 70, winding 72, and transistor 74. When a driving voltage is applied across winding 64, transistor 66 conducts and places the potential at point 48 on capacitor 44. When a driving voltage is applied to winding 72, transistor 74 conducts to place the input signal from source 42 on capacitor 44.

Windings 64 and 72 operate alternatively in such a fashion that capacitor 44 senses first a voltage caused by the output current and then the input source voltage and repeatedly senses each according to the frequency at which the driving voltages are applied and removed from windings 64 and 72. If the switching repetition between the transistors 66 and 74 is of sufficient frequency, a changing input signal will appear to change slowly so that the change will be sensed. However, when a difference exists between the input signal voltage and the potential across resistor 32, capacitor 44 will couple that difference to the input of alternating current amplifier 36 through a resistor 76.

Alternating current amplifier 36 includes transistors 78, 80 and 82. Resistors 84, 86, and 88 provide the biasing and operating point for transistor 78. Transistor 80 is biased by transistor 78 and its operating point determined by resistors 90 and 92. A capacitor 94 couples an output of transistor 80 to transistor 82 and provides the input signal thereto which is characteristic of the voltage difference between the input and the output as sensed by the comparator. Resistors 96 and 98 provide a steady state bias to transistor 82 when a signal is not coupled through capacitor 94. Resistors 100 and 102 provide the operating point for transistor 82.

A capacitor 104 couples the output of transistor 82, which is the ultimate output of the alternating current amplifier 36, to integrator 40. Capacitor 104 performs to reference the alternating current output to the bias voltage 46. Diodes 106 and 108 form the voltage source for the bias clamp. Switch 54 performs to place the bias voltage into the circuit in square wave fashion and at the same frequency as that of switches 50 and 52. Switch 54 is formed by a resistor 110, a winding 112, and a transistor 114. Windings 64, 72, and 112 are wound on the same core with a drive winding (not shown). The drive winding is driven by a predetermined frequency square wave voltage, and in the preferred form, at four thousand cycles per second. The windings are preferably electrostatically shielded to minimize transient voltages.

As indicated by the dots adjacent each winding in the drawing, windings 64 and 112 are in phase with one another and opposite in phase with winding 72. In this manner of phasing, transistors 66 and 114 conduct when transistor 74 is in a non-conductive condition; and vice versa. As previously explained, this phasing relationship is necessary to provide the proper and correct feedback characteristics to the feedback resistor.

Capacitor 104 performs to clamp the bias voltage to the output of the alternating current amplifier. Integrator 40 is formed by a resistor 116 and a capacitor 118 having an input at a point 120 and an output at a point 122. The integrator serves to provide a constant amplitude signal, proportional to the clamped signal, to direct current amplifier 26. The time constant of the integrator limits the response of the output current with respect to variations in input voltage. A pair of transistors 124 and 126 form the direct current amplifier stage. The output resistance of amplifier stage 26 serves as the final and controlling leg of the bridge.

A capacitor 128 is an alternating current by-pass which makes terminal 14 essentially a ground for the alternating current amplifier. Capacitors 130 and 132 filter stray noise and any undesired pickup insuring low level accuracy. Capacitors 134 and 136 are emitter by-pass elements. A resistor 138 and capacitor 140 form a low-pass filter for power supply decoupling. A resistor 142 is a dropping resistance from the power supply to the bias voltage.

It is to be understood that the values and magnitudes expressed in the foregoing description are not to be considered as limiting the scope of the invention to such terms. The values are expressed for purposes of explanation and better understanding of the invention.

The principles of the invention explained in connection with the specific exemplification thereon will suggest many other applications and modifications of the same. It is accordingly desired that, in construing the breadth of the appended claims they shall not be limited to the specific details shown and described in connection with the exemplification thereof.

What is claimed is:

1. A direct current amplifier circuit comprising a bridge circuit having respective terminals and resistance legs connected therebetween, one of said legs comprising the output resistance of a direct current amplifier, a power source connected between two opposed terminals, a load disposed between the other two terminals, a feedback resistance connected in series with said load, a signal source, means for sensing a voltage difference between the voltage developed across said feedback resistance and said signal source, means for amplifying the voltage difference, means for clamping an output of said amplifier means responsive to said sensing means, an integrator circuit responsive to the clamped signal, and an amplifier having an output connected as one leg of said bridge and being responsive to an output of said integrator.

2. A direct current amplifier comprising a bridge circuit having respective terminals and resistance legs connected therebetween, one of said legs comprising the output resistance of a direct current amplifier, a load disposed between two opposed terminals, a power source connected between the other two terminals, a feedback resistance connected in series with said load, a signal source disposed for parallel connection with said feedback resistance, means for sensing a voltage difference between the voltage developed across said feedback resistance and said signal source, means for amplifying the voltage difference, means responsive to said sensing means for clamping an output of said amplifying means, an integrator circuit responsive to the clamped signal, and an amplifier connected to said integrator circuit and having an output connected as one leg of said bridge.

3. A direct current amplifier comprising a bridge circuit having respective terminals and resistance legs connected therebetween, one of said legs comprising the output resistance of a direct current amplifier, a power source connected at two opposed terminals, a load disposed between the other two terminals, a feedback resistance connected in series with said load, a signal source, means for sensing a voltage difference between the voltage developed across said feedback resistance and said signal source, means for amplifying the voltage difference, a bias voltage, means for referencing an output of said amplifying means with said bias voltage, an integrator circuit responsive to an output of said referencing means, and an amplifier having an output circuit and being responsive to an output of said integrator, said output circuit being connected as one leg of said bridge circuit.

4. A direct current amplifier comprising a signal source, a load, a feed back resistance connected in series with said load, means for sensing a voltage difference between said signal source and the voltage developed across said feed back resistance, means for amplifying the voltage difference, a bias voltage, means for referencing an output of said amplifying means with said bias voltage, means for integrating an output of said referencing means, and an amplifier connected to said integrating means, a first resistance series connected with an output of said amplifier, said first resistance and said amplifier output connected in parallel with said load and feed back resistance, second and third resistances series connected to one another and in parallel with the series connected load and feedback resistance, a power source connected between connection of said first resistance and said amplifier output and the connection between said second and third resistances.

5. A direct current amplifier circuit comprising a bridge circuit having respective terminals and resistance legs connected therebetween, one of said legs comprising the output resistance of a direct current amplifier, a power source connected between two opposed terminals, a load disposed between the other two terminals, a feedback resistance connected in series with said load, a signal source, means for sensing a voltage difference between the voltage developed across said feedback resistance and said signal source, amplifier means coupling said voltage difference to said one leg and said output resistance connected as one leg of said bridge being variable in response to the voltage difference.

6. The direct current amplifier circuit of claim 5 wherein said sensing means includes a comparator circuit, means for amplifying the voltage difference, and means for varying the output resistance responsive to an output of said amplifying means.

7. The direct current amplifier circuit of claim 6 wherein said varying means includes means for clamping an output of said amplifying means, an integrator circuit responsive to the clamped signal, and an amplifier stage, said output resistance being the output impedance of said amplifier stage.

References Cited by the Examiner

UNITED STATES PATENTS

| | | | |
|---|---|---|---|
| 3,005,956 | 10/1961 | Grant | 330—146 X |
| 3,087,015 | 4/1963 | Witzke | 330—146 X |
| 3,134,027 | 5/1964 | Gray | 330—10 X |

ROY LAKE, *Primary Examiner.*

R. P. KANANEN, F. D. PARIS, *Assistant Examiners.*